United States Patent
Mishra et al.

(10) Patent No.: US 7,586,956 B1
(45) Date of Patent: Sep. 8, 2009

(54) INTELLIGENT EVENT NOTIFICATION PROCESSING AND DELIVERY AT A NETWORK SWITCH

(75) Inventors: Chandan Mishra, Sunnyvale, CA (US); Ramana Mellacheruvu, San Jose, CA (US); Umesh Mahajan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 958 days.

(21) Appl. No.: 10/982,672

(22) Filed: Nov. 5, 2004

(51) Int. Cl.
*H04J 3/12* (2006.01)
(52) U.S. Cl. ..................... 370/522; 713/154
(58) Field of Classification Search ............. 370/522, 370/392; 713/154; 707/1, 3
See application file for complete search history.

(56) References Cited

U.S. PATENT DOCUMENTS

| | | | |
|---|---|---|---|
| 6,832,341 B1 * | 12/2004 | Vijayan | 714/43 |
| 7,051,044 B1 * | 5/2006 | Fera et al. | 707/104.1 |
| 7,133,869 B2 * | 11/2006 | Bryan et al. | 707/9 |
| 7,257,713 B2 * | 8/2007 | Colvig et al. | 713/182 |
| 2005/0240466 A1 * | 10/2005 | Duggirala | 705/10 |

OTHER PUBLICATIONS

CallHome MIB, 1992-2002 Cisco Systems, Inc. http://www.cisco.com/univercd/cc/td/doc/product/sn5000/mds9000/1_0_3/mibs/callhome.htm, Oct. 26, 2004.
Configuring Call Home, Cisco MDS 9000 Family Configuration Guide, Chapter 23, 78-16087-01, Cisco MDS SAN-OS Release 1.3, Nov. 21, 2003.

* cited by examiner

*Primary Examiner*—Brian D Nguyen
(74) *Attorney, Agent, or Firm*—Weaver Austin Villeneuve & Sampson LLP (57) ABSTRACT

According to the present invention, methods and apparatus are provided for intelligently processing of event notification or callhome messages at a network switch. Alert groups are provided to allow select notification of entities based on the relevance or priority of an event. Destination profiles can be custom configured. A range of message formats are available for compatibility with services such as pager services, email, or XML-based automated parsing applications.

28 Claims, 6 Drawing Sheets

| Profile Name 201 | Destination Address 211 | Message Format 213 | Message Level 215 | Maximum Message Size 217 | Alert Groups 219 | Destination Address 221 | Message Format 223 | Message Level 225 | Maximum Message Size 227 | Alert Groups 229 |
|---|---|---|---|---|---|---|---|---|---|---|

Figure 3

| Alert Group 301 | Event Type 311 | Event Type 313 | Event Type 315 |

INTELLIGENT EVENT NOTIFICATION PROCESSING AND DELIVERY AT A NETWORK SWITCH

BACKGROUND OF THE INVENTION

1. Field of the Invention

The present invention generally relates to event notification. More specifically, the present invention provides techniques and mechanisms for intelligently processing and delivering event notification or callhome messages at a network switch.

2. Description of Related Art

Network devices are often relied upon to provide high availability and high reliability operation. In many instances, network switches may operate without the constant monitoring of a system administrator. However, many events may occur that may warrant attention. For example, a fibre channel switch may experience a line card failure or a software crash that warrants attention from a systems administrator. In another example, a fibre channel switch may experience minor glitches that warrant attention only from a test engineer.

Typical event notification mechanisms do not efficiently process event messages prior to distribution to end users, system administrators, testing groups, network operation centers, etc. Conventional mechanisms in network switches for notifying the appropriate entities when an event occurs are limited and inflexible. Consequently, it is desirable to provide techniques for improving event notification processing to allow more effective and efficient event notification or distribution of callhome messages.

SUMMARY OF THE INVENTION

According to the present invention, methods and apparatus are provided for intelligently processing of event notification or callhome messages at a network switch. Custom destination profiles can be configured to determine how callhome messages should be sent to a particular set of destinations. Alert groups are provided to selectively choose events for these destination profiles. One can also configure filtering policies for each destination profile based on the relevance or priority of an event.

In one embodiment, a method for intelligent callhome message processing and delivery at a fibre channel switch is provided. A callhome event is detected. A plurality of destinations associated with destination profiles at a fibre channel switch are filtered based on the alert group associated with the callhome event. The plurality of destinations associated with destination profiles at the fibre channel switch are also filtered based on the priority associated with the callhome event. The callhome event is transmitted to selected destinations.

In another embodiment, a fibre channel switch is provided. The fibre channel switch includes a processor and an output interface. The processor is configured to filter a plurality of destinations associated with destination profiles at a fibre channel switch based on the alert group and priority associated with a detected callhome event. The output interface is configured to transmit the callhome event to selected destinations.

In another embodiment, a network is provided. The network includes a fibre channel switch, a first destination, and a second destination. The fibre channel switch is configured to filter a plurality of destinations associated with destination profiles at a fibre channel switch based on the alert group and priority associated with a detected callhome event. The first destination is operable to receive a first subset of the callhome events detected at the fibre channel switch and the second destination is operable to receive a second subset of the callhome events detected at the fibre channel switch.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel networks. However, it should be noted that the techniques of the present invention can be applied to different types of networks. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

A fibre channel switch is often required to provide highly reliable service with minimal monitoring. However, various events such as hardware faults, system log messages, licensing violation messages, and software failures warrant attention. Some of the events such as hardware faults require the immediate attention of support engineers. Other events such as system log messages may only need to be transmitted to a network operations center.

A callhome system provides notification of system events using a variety of mechanisms. Any system providing the automated transmission of notification information from a switch to one or more end users is referred to herein as a callhome system. In one example, a callhome system provides e-mail-based notification of critical system events. A versatile range of message formats are available for optimal compatibility with pager services, standard e-mail, or XML-based automated parsing applications. Common uses of this feature may include direct paging of a network engineer, e-mail notification to operations staff, or direct contact with a technical assistance center.

However, conventional callhome systems often unnecessarily notify too large a number of parties for a given event. For example, a network card removal event may be sent to all destinations provided to a fibre channel switch. However, a network card removal event may only warrant notifying a systems engineer. Typical fibre channel switches do not provide intelligent processing of event messages or alerts before transmitting them to their destinations.

Consequently, the techniques of the present invention allow the intelligent grouping of destinations and alerts to allow certain entities to only receive selected types of events. For example, a test engineer may configure the system to notify the engineer of only test events. A building maintenance and management group may configure the system to notify them of any temperature related events. Furthermore, groups may configure priority or message levels so that only event messages of a certain priority are received.

Figure 1:
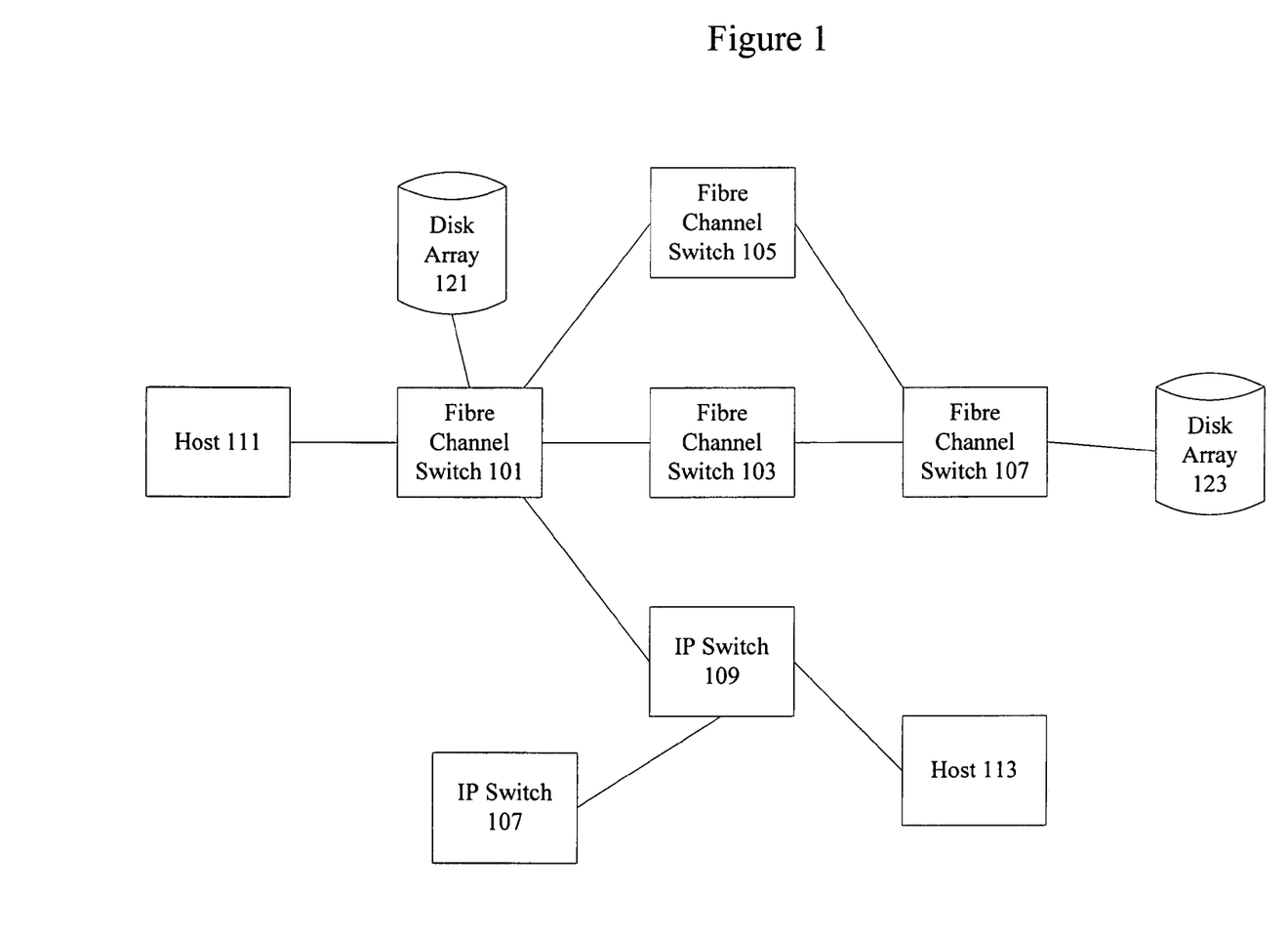
FIG. 1 is a diagrammatic representation showing a fibre channel network that can use the techniques of the present invention.

FIG. 1 is a diagrammatic representation showing a network topology that can use the techniques of the present invention. A storage area network includes host 111 along with storage node disk arrays 121 and 123. The storage area network also includes fibre channel switches 101, 103, 105, and 107. A fibre channel switch 101 is also coupled to an Internet Protocol (IP) network through switch 109. The IP network includes IP switches 107 and 109 as well as host 113. In one example, each fibre channel switch 101, 103, 105, and 107 are configured to send callhome messages. According to various embodiments, the destinations for the messages may reside on an IP network, a telephony network, the storage area network itself, or some other network.

Figure 2:
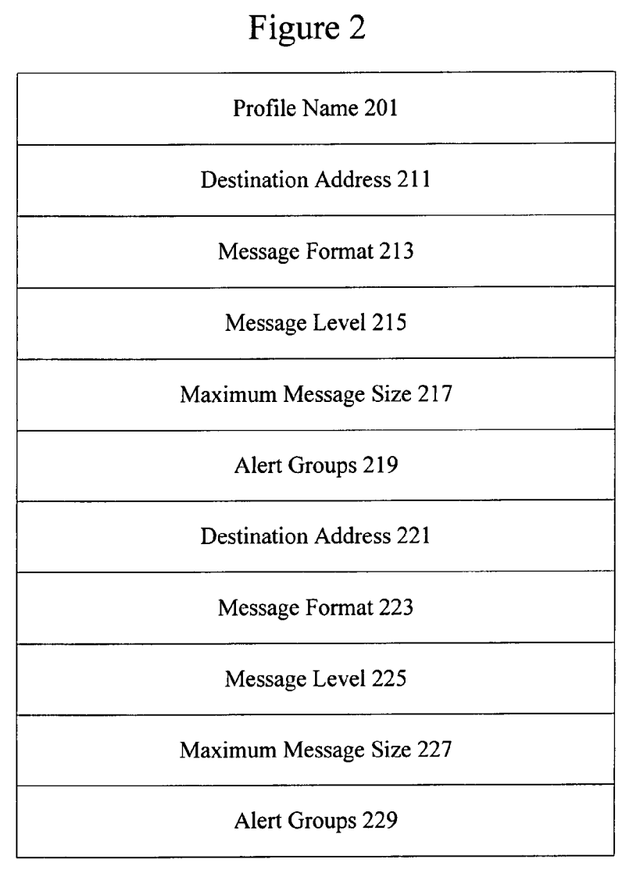
FIG. 2 is a diagrammatic representation showing a destination profile.

FIG. 2 is a diagrammatic representation of a destination profile. A callhome system is provided directly in a fibre channel switch. Each fibre channel switch can support multiple destination profiles, each with separate potential destinations. Each profile may be predefined or user-defined. Any data that is used to represent one or more destinations is referred to herein as a destination profile. In one example, a destination profile may include the email address and the pager number of a systems administrator.

According to various embodiments, a destination profile includes delivery information for an event or alert notification. Destination profiles are typically configured by the network administrator. At least one destination profile is used. In some examples, predefined destination profiles are selected. Custom destination profiles can also be provided. A custom profile includes a profile name 201, destination addresses 211 and 221, and message format information 213 and 223. In one example, a profile name 201 is a string that uniquely identifies each user-defined destination profile and is limited to 32 alphanumeric characters.

Destination addresses 211 and 221 are the actual addresses, pertinent to the transport mechanism, to which the alerts should be sent. For example, destination addresses 211 and 221 can be email addresses or pager numbers. Message formats 213 and 223 identify format options for corresponding destination addresses 211 and 221. For example, the message formats can be full-txt, short-txt, or eXtensible Markup Language (XML).

Message level fields 215 and 225 indicate the priority level the events should reach before being forwarded to an associated destination. Message levels will be described in more detail below. Maximum message size 217 and 227 indicate a maximum size for transmitted messages. Alert groups 219 and 229 indicate what type of alerts should be forwarded to an associated destination an will also be described in more detail below.

In one example, a destination profile can be configured using the following command sequences:
switch(config-callhome)#
destination-profile
full-txt-destination email-addr
person@place.com
This command sequence configures an email address (person@place.com) for a predefined destination profile (full-txt-destination). This predefined destination profile sends out message in "full-txt" format that provides the complete, detailed explanation of the failure.
switch(config-callhome)#
destination-profile
full-txt-destination message-size
1000000
This command sequence configures a maximum destination message size for the predefined full-txt-destination profile. The valid range is 0 to 1,000,000 bytes and the default is 500,000. A value of 0 implies that a message of any size can be sent a predefined destination message size for a message sent in full text format. The valid range is 0 to 1,000,000 bytes and the default is 500,000. A value of 0 implies that a message of any size can be sent.
switch(config-callhome)#
destination-profile
short-txt-destination email-addr
person@place.com
This sequence configures an e-mail address for the predefined short-txt-destination profile. The email-addresses in this destination profile receive messages in short-txt format. This format provides the basic explanation of the failure in the callhome message.
switch(config-callhome)#
destination-profile
short-txt-destination message-size
100000
This sequence configures a maximum destination message size for the predefined short-txt-destination profile. The valid range is 0 to 1,000,000 bytes and the default is 4000. A value of 0 implies that a message of any size can be sent.

Figure 3:
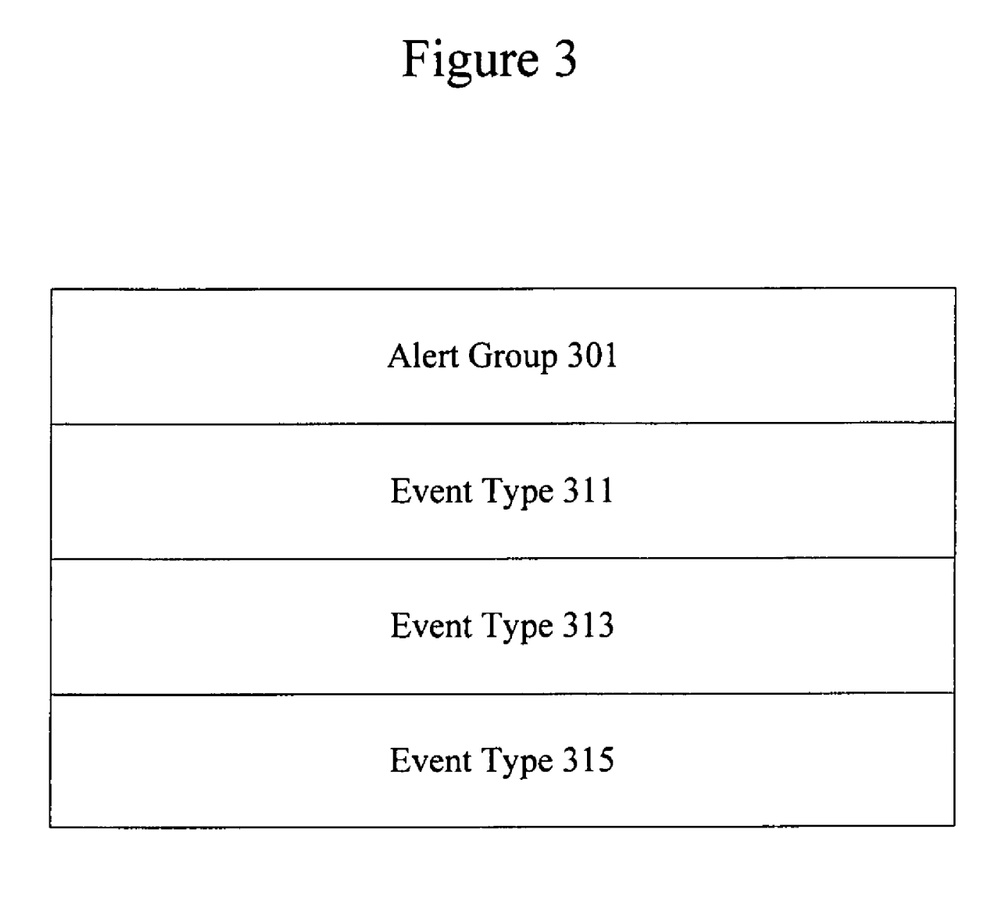
FIG. 3 is a diagrammatic representation depicting an alert group.

FIG. 3 is a diagrammatic representation showing an alert group. According to various embodiments, an alert group is a set of event types. For example, an alert group may be an environmental alert group. Event types may include temperature alerts, fan failures, power failures, etc. Each alert group 301 includes one or more event type 311, 313, and 315. Alert groups can be predefined or user defined. Alert groups allow selection of predefined types of callhome alert and event notifications for destination profiles (predefined and user-defined). Destination profiles can be associated with multiple alert groups. According to various embodiments, alert groups can be configured using the following command sequences:

switch(config-callhome)# destination-profile test1 alert-group test

This sequence configures user-defined destination profile (test1) to receive all user-generated callhome test notifications switch(config-callhome)# destination-profile short-txt-destination alert-group test This sequence configures predefined short-text destination profile to receive all user-generated callhome test notifications.

switch(config-callhome)# destination-profile test1 alert-group all

This sequence configures user-defined destination profile (test1) to receive callhome notifications for all events.

switch(config-callhome)# destination-profile short-txt-destination alert-group all This sequence configures predefined short-text destination message profile to receive callhome notifications for all (default) events.

switch(config-callhome)# destination-profile test1 alert-group environmental

This sequence configures user-defined destination message profile (test1) to receive callhome notifications for power, fan, and temperature-related events.

switch(config-callhome)# destination-profile short-txt-destination alert-group environmental This sequence configures predefined short-text destination message profile to receive callhome notifications for power, fan, and temperature-related events.

switch(config-callhome)# destination-profile test1 alert-group inventory

This sequence configures user-defined destination message profile (test1) to send callhome notifications for inventory status events.

switch(config-callhome)# destination-profile short-txt-destination alert-group inventory This sequence configures predefined destination message profile to receive callhome notifications for inventory status events.

switch(config-callhome)# destination-profile test1 alert-group linecard-hardware This sequence configures user-defined destination message profile (test1) to receive callhome notifications for module-related events.

switch(config-callhome)# destination-profile short-txt-destination alert-group linecard-hardware This sequence configures predefined short-text destination message profile to receive callhome notifications for module-related events.

switch(config-callhome)# destination-profile test1 alert-group supervisor-hardware This sequence configures user-defined destination message profile (test1) to receive callhome notifications for supervisor-related events.

switch(config-callhome)# destination-profile short-txt-destination alert-group supervisor-hardware This sequence configures predefined short-text destination message profile to receive callhome notifications for supervisor-related events.

switch(config-callhome)# destination-profile test1 alert-group system

This sequence configures user-defined destination message profile (test1) to receive callhome notifications for software-related events.

switch(config-callhome)# destination-profile short-txt-destination alert-group system This sequence configures predefined short-text destination message profile to receive callhome notifications for software-related events.

Figure 4:
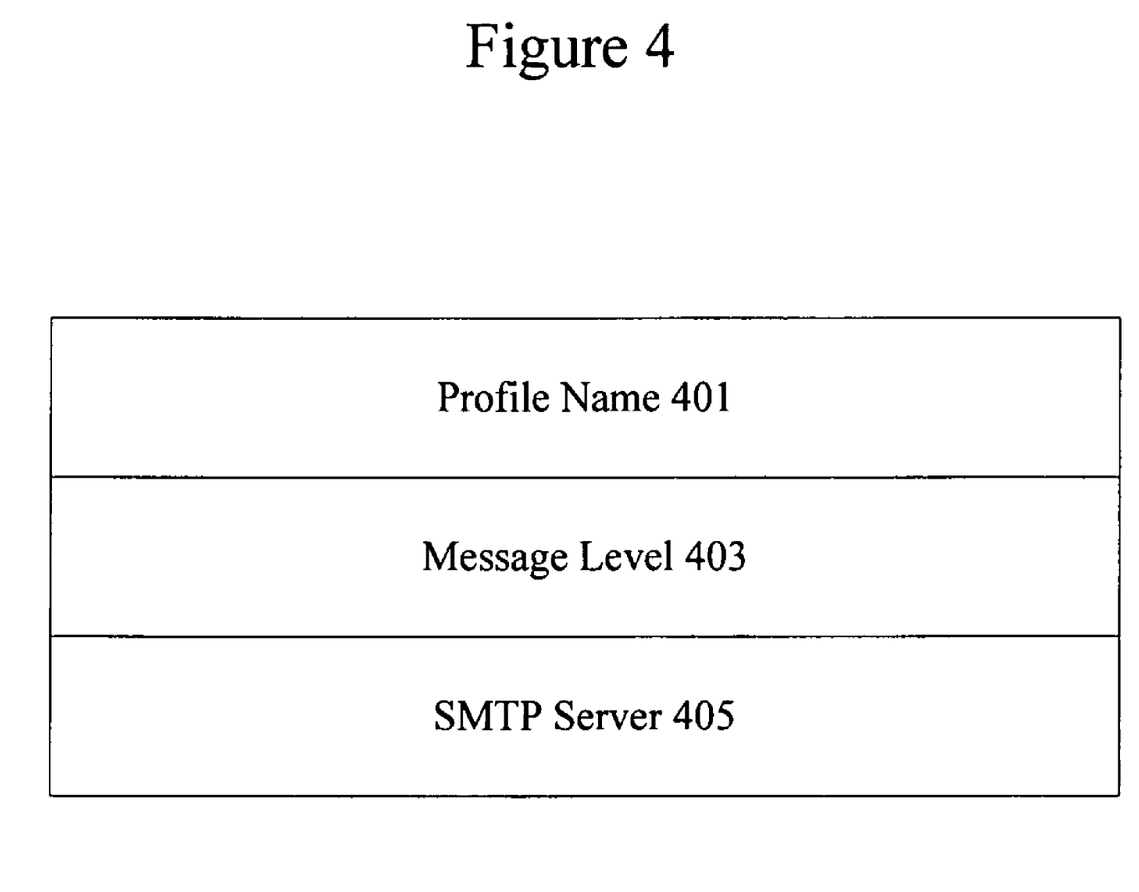
FIG. 4 is a diagrammatic representation showing message levels.

FIG. 4 is a diagrammatic representation showing message levels. The message level 403 allows a user to filter messages based on a level of urgency. Each destination profile 401 (predefined and user-defined) is associated with a callhome message level threshold 403. According to various embodiments, any message with a value lower than the urgency threshold is not sent. In some examples, the urgency level ranges from 0 (lowest level of urgency) to 9 (highest level of urgency), and the default is 0 (all messages are sent).

In some examples, message levels can be configured in the following manner:

switch(config-callhome)# destination-profile test message-level 5

This sequence configures the message level urgency as 5 and above for the user-defined profile (test).

switch(config-callhome)# no destination-profile oldtest message-level 7

This sequence removes a previously configured urgency level and reverts it to the default of 0 (all messages are sent).

In one example, the following severity levels can be used:

Catastrophic (9) Catastrophic Network wide catastrophic failure.

Disaster (8) Disaster Significant network impact.

Fatal (7) Fatal System is unusable.

Critical (6) Critical Critical conditions, immediate attention needed.

Major (5) Major Major conditions.

Minor (4) Minor Minor conditions.

Warning (3) Warning Warning conditions.

Notify (2) Notification Basic notification and informational messages.

Possibly independently insignificant.

Normal (1) Normal Normal event signifying return to normal state.

Debug (0) Debugging Debugging messages.

According to various embodiments, a destination profile can have a single message level. However, in some examples, different message levels can be associated with various destinations within a destination profile. For example, a system administrator may configure a profile so that email notification is sent for messages of all priorities 0-9 while pager notification is sent only for messages of priority 5-9.

Mail server configuration information 405 can also be included using the following sequence:

switch(config-callhome)# transport email smtp-server 192.168.1.1 switch(config-callhome)# transport email smtp-server 192.168.1.1 port 30

This sequence configures the Domain Name Server (DNS) or IP address of the Simple Mail Transfer Protocol (SMTP). The port usage defaults to 25 if no port is specified. In some embodiments, the port number is optional and, if required, may be changed depending on the server location.

A variety of events can trigger callhome messages. In some examples, events include system events generated by failure of a software system that is critical to unit operation, environmental events related to power, fan, and environment sensing elements such as temperature alarms, fibre channel switching module hardware events related to standard or intelligent switching modules, supervisor hardware events related to supervisor modules, inventory status events provided whenever a unit is cold booted, or when line cards are inserted or removed, and test events.

According to various embodiments, individual events can include the following:

SW_CRASH—A software process has crashed with a stateless restart, indicating an interruption of a service.

SW_SYSTEM_INCONSISTENT—Inconsistency detected in software or file system.

TEMPERATURE_ALARM—Thermal sensor indicates temperature reached operating threshold.

POWER_SUPPLY_FAILURE—Power supply failed.

FAN_FAILURE—Cooling fan has failed.

LINECARD_FAILURE—Switching module operation failed.

POWER_UP_DIAGNOSTICS_FAILURE—Switching module failed power-up diagnostics.

PORT_FAILURE—Hardware failure of interface port(s).

BOOTFLASH_FAILURE—Failure of boot compact Flash card.

SUP_FAILURE—Supervisor module operation failed.

POWER_UP_DIAGNOSTICS_FAILURE—Supervisor module failed power-up diagnostics.

INBAND_FAILURE—Failure of in-band communications path.

EOBC_FAILURE—Ethernet out-of-band channel communications failure.

MGMT_PORT_FAILURE—Hardware failure of management Ethernet port.

LICENSE_VIOLATION—Feature in use is not licensed

Figure 5:
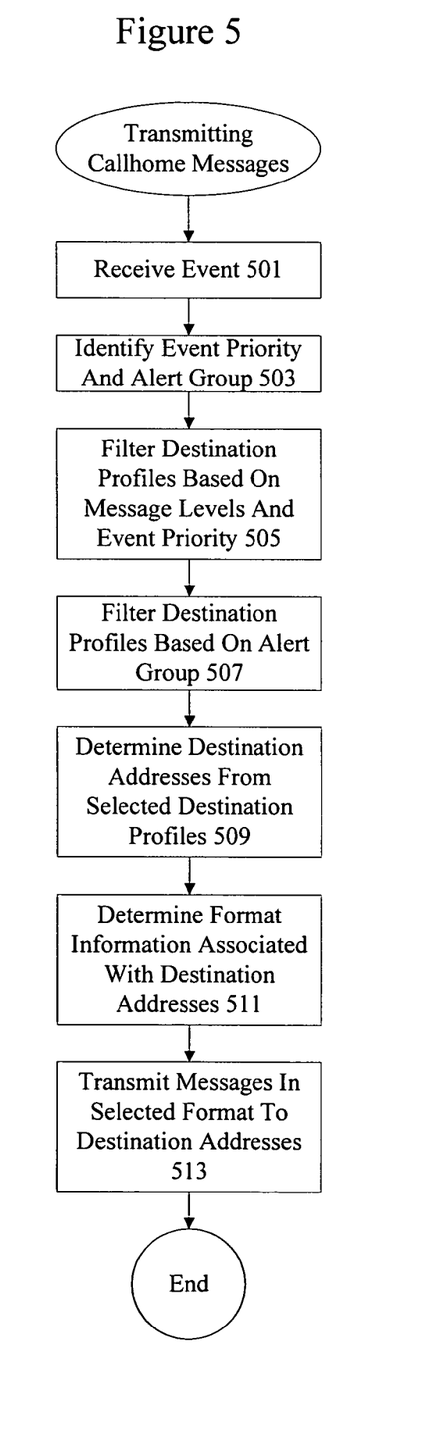
FIG. 5 is a flow process diagram showing one technique for transmitting callhome messages.

FIG. 5 is a flow process diagram showing one technique for transmitting callhome messages. At 501, an event is received. An event may be a linecard failure, supervisor module failure, license violation, fan failure, etc. At 503, the event priority and alert group are identified. For example, the event may be a critical event that warrants notification of all parties involved or may be a test event that warrants notification of a group of test engineers. At 505, destination profiles are filtered based on message levels and event priority. According to various embodiments, destination profiles that have message levels that are higher than an event priority are not selected. For example, a system engineering group with a message level of 5 may not be notified of events with priority levels of 4 or lower. At 507, filtering is performed based on alert groups associated with destination profiles. According to various embodiments, certain types of alerts are only transmitted to particular destinations. At 509, destination addresses are determined from destination profiles that are selected. At 511, format information associated with destination addresses is determined. At 513, messages are transmitted in the selected format to destination addresses. According to various embodiments, if an event does not belong to any of the alert-groups associated with a destination profile, the message corresponding to that event is not sent out to the destination addresses associated with that alert-group.

Figure 6:
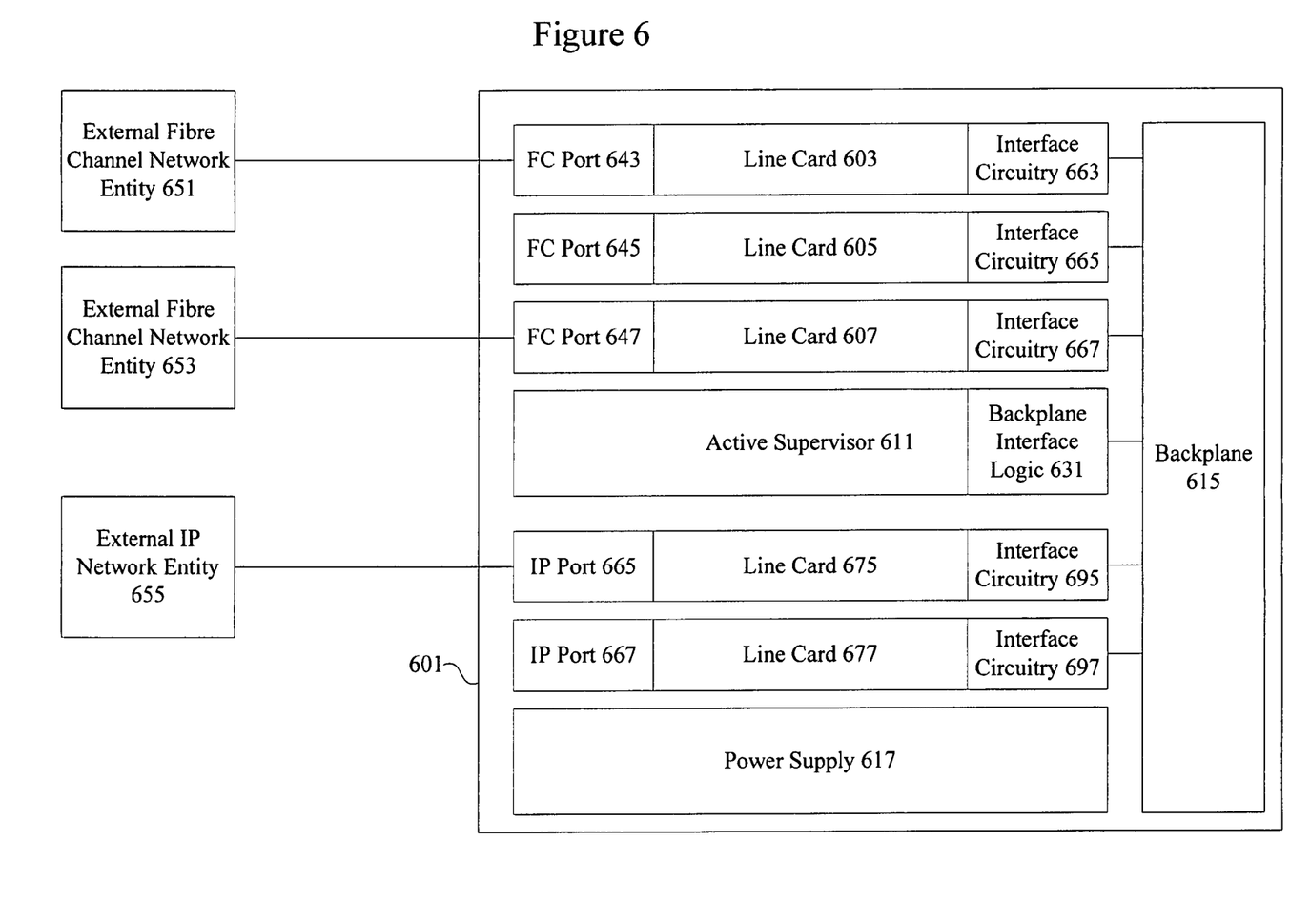
FIG. 6 is a diagrammatic showing one example of a fibre channel switch.

FIG. 6 is a diagrammatic representation of one example of a fibre channel switch that can be used to implement techniques of the present invention. Although one particular configuration will be described, it should be noted that a wide variety of switch and router configurations are available. The tunneling switch 601 may include one or more supervisors 611. According to various embodiments, the supervisor 611 has its own processor, memory, and storage resources.

Line cards 603, 605, and 607 can communicate with an active supervisor 611 through interface circuitry 683, 685, and 687 and the backplane 615. According to various embodiments, each line card includes a plurality of ports that can act as either input ports or output ports for communication with external fibre channel network entities 651 and 653. The backplane 615 can provide a communications channel for all traffic between line cards and supervisors. Individual line cards 603 and 607 can also be coupled to external fibre channel network entities 651 and 653 through fibre channel ports 643 and 647.

Line cards 675 and 677 can communicate with an active supervisor 611 through interface circuitry 695 and 697. Line cards 675 and 677 also include Internet Protocol (IP) ports for communication with external IP network entities including IP network entity 655.

External fibre channel network entities 651 and 653 can be nodes such as other fibre channel switches, disks, RAIDS, tape libraries, or servers. It should be noted that the switch can support any number of line cards and supervisors. In the embodiment shown, only a single supervisor is connected to the backplane 615 and the single supervisor communicates with many different line cards. The active supervisor 611 may be configured or designed to run a plurality of applications such as routing, domain manager, system manager, and utility applications.

According to one embodiment, the routing application is configured to provide credits to a sender upon recognizing that a frame has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method comprising:
   detecting a callhome event;
   filtering a plurality of destinations associated with destination profiles at a fibre channel switch based on an alert group associated with the callhome event;
   filtering the plurality of destinations associated with the destination profiles at the fibre channel switch based on a priority associated with the callhome event; and
   transmitting the callhome event to selected destinations.

2. The method of claim 1, wherein the callhome event is an event notification.

3. The method of claim 2, wherein the destination profiles comprise delivery information for the callhome event.

4. The method of claim 3, wherein the destination profiles further comprise format information for delivery of the event notification.

5. The method of claim 1, wherein the destination profiles are associated with multiple alert groups.

6. The method of claim 5, wherein alert groups include vendor, customer, environmental, and system alert groups.

7. The method of claim 1, wherein destinations associated with a destination profile include email addresses, pager addresses, and XML applications.

8. The method of claim 7, wherein each destination profile includes a message-level.

9. The method of claim 8, wherein a callhome message is provided for the destination profile if the callhome event priority exceeds the message-level.

10. A fibre channel switch, comprising:
a processor configured to filter a plurality of destinations associated with destination profiles at the fibre channel switch based on an alert group and priority associated with a detected callhome event;
an output interface configured to transmit the callhome event to selected destinations.

11. The fibre channel switch of claim 10, wherein the callhome event is an event notification.

12. The fibre channel switch of claim 11, wherein the destination profiles comprise delivery information for the callhome event.

13. The fibre channel switch of claim 12, wherein the destination profiles further comprise format information for delivery of the event notification.

14. The fibre channel switch of claim 10, wherein the destination profiles are associated with multiple alert groups.

15. The fibre channel switch of claim 14, wherein the multiple alert groups include vendor, customer, environmental, and system alert groups.

16. The fibre channel switch of claim 10, wherein destinations associated with a destination profile include email addresses, pager addresses, and XML applications.

17. The fibre channel switch of claim 16, wherein each destination profile includes a message-level.

18. The fibre channel switch of claim 17, wherein a callhome message is provided for the destination profile if the callhome event priority exceeds the message-level.

19. A computer readable medium comprising:
computer code for detecting a callhome event;
computer code for filtering a plurality of destinations associated with destination profiles at a fibre channel switch based on an alert group associated with the callhome event;
computer code for filtering the plurality of destinations associated with destination profiles at the fibre channel switch based on a priority associated with the callhome event; and
computer code for transmitting the callhome event to selected destinations.

20. The computer readable medium of claim 19, wherein the callhome event is an event notification.

21. A system comprising:
means for detecting a callhome event;
means for filtering a plurality of destinations associated with destination profiles at a fibre channel switch based on an alert group associated with the callhome event;
means for filtering the plurality of destinations associated with the destination profiles at the fibre channel switch based on a priority associated with the callhome event; and
means for transmitting the callhome event to selected destinations.

22. The system of claim 21, wherein the callhome event is an event notification.

23. The system of claim 22, wherein the destination profiles comprise delivery information for the callhome event.

24. The system of claim 23, wherein the destination profiles further comprise format information for delivery of the event notification.

25. The system of claim 21, wherein the destination profiles are associated with multiple alert groups.

26. A network, comprising:
a fibre channel switch configured to filter a plurality of destinations associated with destination profiles at the fibre channel switch based on an alert group and a priority associated with a detected callhome event;
a first destination operable to receive a first subset of the callhome events detected at the fibre channel switch; and
a second destination operable to receive a second subset of the callhome events detected at the fibre channel switch.

27. The network of claim 26, wherein the first destination is a mail server associated with an email address.

28. The network of claim 26, wherein the second destination is a short message services server associated with a pager address.

* * * * *